US009159318B2

(12) United States Patent
Hakkani-Tur et al.

(10) Patent No.: US 9,159,318 B2
(45) Date of Patent: *Oct. 13, 2015

(54) UNSUPERVISED AND ACTIVE LEARNING IN AUTOMATIC SPEECH RECOGNITION FOR CALL CLASSIFICATION

(71) Applicant: AT&T Intellectual Property II, L.P., Atlanta, GA (US)

(72) Inventors: Dilek Z. Hakkani-Tur, Los Altos, CA (US); Mazin G. Rahim, Warren, NJ (US); Giuseppe Riccardi, Hoboken, NJ (US); Gokhan Tur, Los Altos, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/468,375

(22) Filed: Aug. 26, 2014

(65) Prior Publication Data

US 2015/0046159 A1    Feb. 12, 2015

Related U.S. Application Data

(63) Continuation of application No. 11/063,910, filed on Feb. 23, 2005, now Pat. No. 8,818,808.

(51) Int. Cl.
*G10L 15/18* (2013.01)
*G10L 15/26* (2006.01)
*G10L 15/06* (2013.01)

(52) U.S. Cl.
CPC .............. *G10L 15/18* (2013.01); *G10L 15/063* (2013.01); *G10L 15/26* (2013.01)

(58) Field of Classification Search
CPC ... G10L 15/265; G10L 15/063; G10L 15/065; G10L 15/18; G10L 15/26

USPC ................................................... 704/243, 235
See application file for complete search history.

(56) References Cited

U.S. PATENT DOCUMENTS

| 6,122,613 | A  | 9/2000  | Baker |
| 6,453,307 | B1 | 9/2002  | Schapire |
| 6,487,534 | B1 | 11/2002 | Thelen et al. |
| 2003/0028375 | A1 | 2/2003 | Kellner |
| 2003/0163302 | A1 | 8/2003 | Yin |
| 2004/0138885 | A1 | 7/2004 | Lin |
| 2006/0025995 | A1 | 2/2006 | Erhart et al. |

OTHER PUBLICATIONS

Tur et al., "Active and Semi-Supervised Learning for Spoken Language Understanding", Aug. 2003.
G. Riccardi et al., "Active and Unsupervised Learning for Automatic Speech Recognition", AT&T Labs—Research, Florham Park, NJ, USA, 2003.
R. Iyer et al, "Unsupervised Training Techniques for Natural Language Call Routing", 2002 IEEE, BBN Technologies, Speech and Language, Cambridge, Massachusettes, USA.

*Primary Examiner* — Angela A Armstrong

(57) ABSTRACT

Utterance data that includes at least a small amount of manually transcribed data is provided. Automatic speech recognition is performed on ones of the utterance data not having a corresponding manual transcription to produce automatically transcribed utterances. A model is trained using all of the manually transcribed data and the automatically transcribed utterances. A predetermined number of utterances not having a corresponding manual transcription are intelligently selected and manually transcribed. Ones of the automatically transcribed data as well as ones having a corresponding manual transcription are labeled. In another aspect of the invention, audio data is mined from at least one source, and a language model is trained for call classification from the mined audio data to produce a language model.

20 Claims, 7 Drawing Sheets

UNSUPERVISED AND ACTIVE LEARNING IN AUTOMATIC SPEECH RECOGNITION FOR CALL CLASSIFICATION

PRIORITY INFORMATION

The present application is a continuation of U.S. patent application Ser. No. 11/063,910, filed Feb. 23, 2005, the content of which is incorporated herein by reference in its entirety.

BACKGROUND OF THE INVENTION

1. Field of the Invention

The present invention relates to speech recognition and more specifically to call classification of speech for spoken language systems.

2. Introduction

Existing systems for rapidly building spoken language dialog applications require an extensive amount of manually transcribed and labeled data. This task is not only expensive, but is also quite time consuming. An approach is desired that significantly reduces an amount of manpower required to transcribe and label data while creating spoken language models with performance approaching that of spoken language models created with extensive manual transcription and labeling.

SUMMARY OF THE INVENTION

In a first aspect of the invention, a method is provided. The method includes providing utterance data including at least a small amount of manually transcribed data, performing automatic speech recognition on ones of the utterance data not having a corresponding manual transcription to produce automatically transcribed utterances, training a model using all of the manually transcribed data and the automatically transcribed utterances, intelligently selecting a predetermined number of utterances not having a corresponding manual transcription, manually transcribing the selected number of utterances not having a corresponding manual transcription, and labeling ones of the automatically transcribed data as well as ones of the manually transcribed data.

In a second aspect of the invention, a system is provided. The system includes an automatic speech recognizer, a learning module, a training module, and a labeler. The automatic speech recognizer is configured to automatically transcribe utterance data not having a corresponding manual transcription and produce a set of automatically transcribed data. The learning module is configured to intelligently select a predetermined number of utterances from the set of automatically transcribed data to be manually transcribed, added to a set of manually transcribed data, and deleted from the set of automatically transcribed data. The training module is configured to train a language model using the set of manually transcribed data and the set of automatically transcribed data. The labeler is to label at least some of the set of automatically transcribed data and the set of manually transcribed data.

In a third aspect of the invention, a machine-readable medium having a group of instructions recorded thereon is provided. The machine-readable medium includes instructions for performing automatic speech recognition on ones of a plurality of utterance data not having a corresponding manual transcription to produce automatically transcribed utterances, instructions for training a model using manually transcribed data and the automatically transcribed utterances, instructions for intelligently selecting, for manual transcription, a predetermined number of utterances from the utterance data not having a corresponding manual transcription, instructions for receiving new manually transcribed data, and instructions for permitting labeling of ones of the automatically transcribed as well as ones of the manually transcribed data.

In a fourth aspect of the invention, a method is provided. The method includes mining audio data from at least one source, and training a language model for call classification from the mined audio data to produce a language model.

In a fifth aspect of the invention, a machine-readable medium having a group of instructions recorded thereon for a processor is provided. The machine-readable medium includes a set of instructions for mining audio data from at least one source, and a set of instructions for training a language model for call classification from the mined audio data to produce a language model.

In a sixth aspect of the invention, an apparatus is provided. The apparatus includes a processor and storage to store instructions for the processor. The processor is configured to mine audio data from at least one source, and train a language model for call classification from the mined audio data to produce a language model.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Introduction

Spoken natural-language understanding (SLU) plays an important role in automating complex transactional requests, such as those for customer care and help desk. SLU provides callers with the flexibility to speak naturally without laboriously following a directed set of prompts. We present a novel approach that reduces the amount of transcribed data that may be needed to build automatic speech recognition (ASR) models. Our method may involve an iterative process that may be employed where the performance of the ASR models can be improved through both unsupervised and active learning. For unsupervised learning, a two step method may be adopted that involves decoding followed by model building. For active learning, a confidence score may be computed and used to identify problematic utterances that are to be manually transcribed.

Overview

Figure 1:
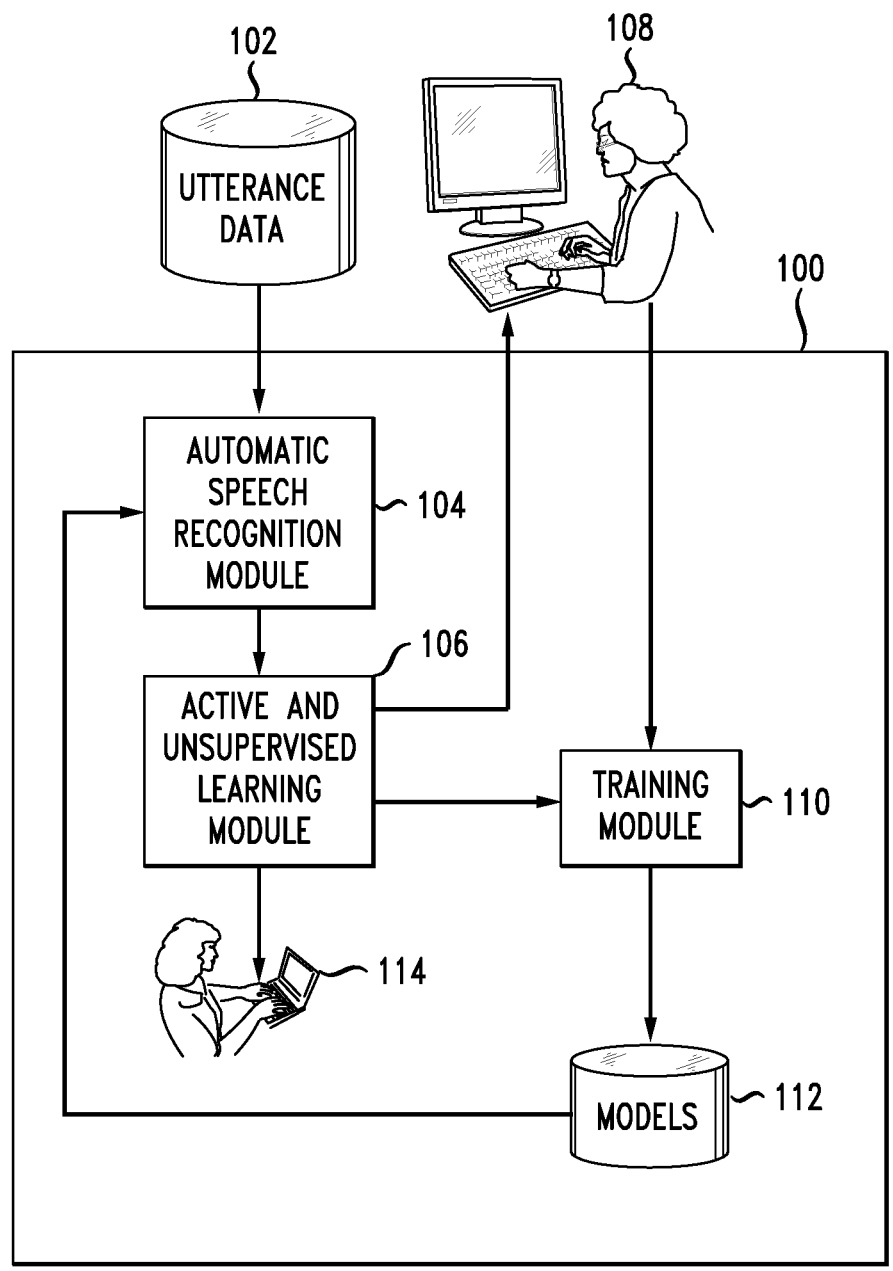
FIG. 1 illustrates an exemplary system consistent with the principles of the invention.

FIG. 1 illustrates an exemplary system 100 consistent with the principles of the invention. System 100 may include an automatic speech recognition module 104, an active and unsupervised learning module 106, a training module 110, models 112, and a labeler 114.

Automatic speech recognition module 104 may receive utterance data 102 that may include audible utterances as well as at least a small amount of manually transcribed data. Automatic speech recognition module 104 may produce automatically transcribed utterance data from the audible utterance data.

Active and unsupervised learning module 106 may receive the automatically transcribed utterances from the automatic speech recognizer module 104 and may intelligently select a small fraction of the utterance data for manual transcription. The details of the selection process are described below.

A transcriber 108 may manually transcribe the selected utterance data, which may then be provided to training module 110. Active and unsupervised learning module 106 may provide the remaining utterance data, which includes automatically transcribed utterances, to training module 110.

Training module 110 may produce models 112, which may be language models, for example, spoken language understanding (SLU) models from the manually and automatically transcribed data.

When system 100 determines that word accuracy of automatic transcription module 104 has not converged, then automatic transcription module may again automatically transcribe ones of the audible utterance data not having a corresponding manual transcription, active and unsupervised learning module 106 may again select a small fraction of the utterance data for manual transcription, and training module 106 may again produce models 112 from the manually and automatically transcribed data Labeler 114 may be a human being who manually labels the automatically and manually transcribed data, In one implementation consistent with the principles of the invention, labeler 114 may label the automatically transcribed data only after system 100 determines that word accuracy has converged.

Figure 2:
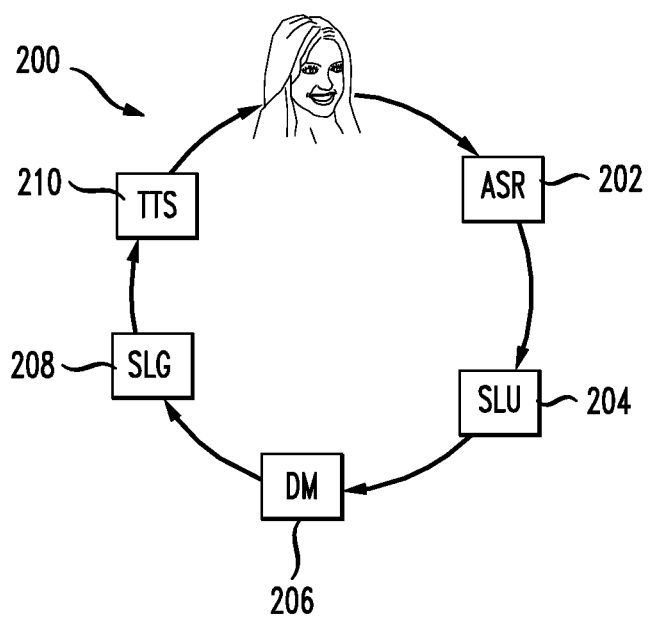
FIG. 2 illustrates an exemplary spoken dialog system, which may use a model built by the system of FIG. 1.

FIG. 2 is a functional block diagram of an exemplary natural language spoken dialog system 200, which may execute using models (for example, SLU model and ASR model) built by a system such as, for example system 100. Natural language spoken dialog system 200 may include an ASR module 202, a SLU module 204, a dialog management (DM) module 206, a spoken language generation (SLG) module 208, and a text-to-speech (TTS) module 210.

ASR module 202 may analyze speech input and may provide a transcription of the speech input as output. SLU module 204 may receive the transcribed input and may use a natural language understanding model to analyze the group of words that are included in the transcribed input to derive a meaning from the input. DM module 206 may receive the meaning of the speech input as input and may determine an action, such as, for example, providing a spoken response, based on the input. SLG module 208 may generate a transcription of one or more words in response to the action provided by DM 206. TTS module 210 may receive the transcription as input and may provide generated audible as output based on the transcribed speech.

Thus, the modules of system 200 may recognize speech input, such as speech utterances, may transcribe the speech input, may identify (or understand) the meaning of the transcribed speech, may determine an appropriate response to the speech input, may generate text of the appropriate response and from that text, generate audible "speech" from system 200, which the user then hears. In this manner, the user can carry on a natural language dialog with system 200. Those of ordinary skill in the art will understand the programming languages and means for generating and training ASR module 202 or any of the other modules in the spoken dialog system. Further, the modules of system 200 may operate independent of a full dialog system. For example, a computing device such as a smartphone (or any processing device having an audio processing capability, for example a PDA with audio and a WiFi network interface) may have an ASR module wherein a user may say "call mom" and the smartphone may act on the instruction without a "spoken dialog interaction".

Figure 3:
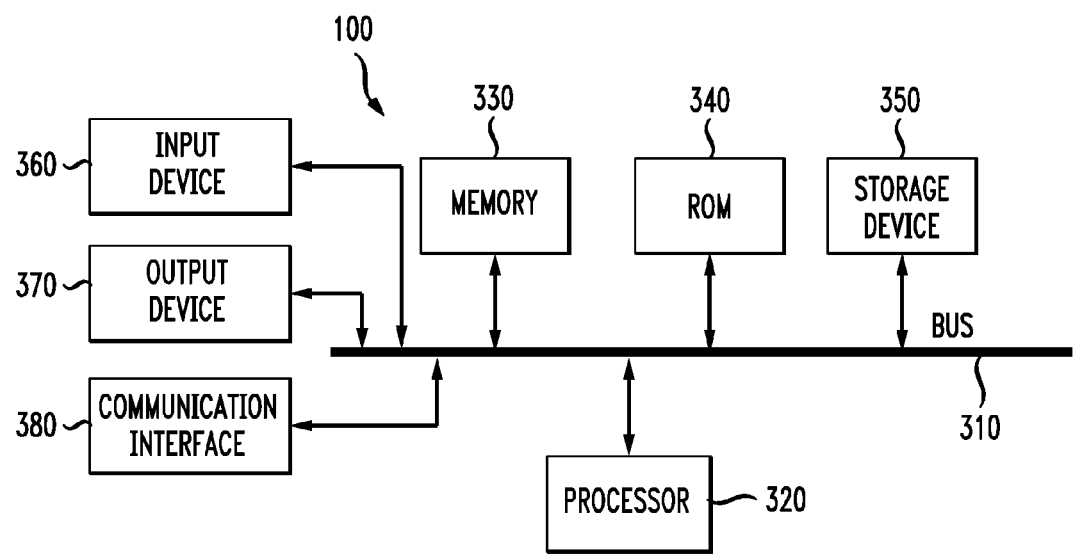
FIG. 3 illustrates an exemplary processing system which may be used to implement one or more components of the exemplary system of FIGS. 1 and/or 2.

FIG. 3 illustrates an exemplary processing system 300 in which one or more of the modules of system 100 or 200 may be implemented. Thus, system 100 or 200 may include at least one processing system, such as, for example, exemplary processing system 300. System 300 may include a bus 310, a processor 320, a memory 330, a read only memory (ROM) 340, a storage device 350, an input device 360, an output device 370, and a communication interface 380. Bus 310 may permit communication among the components of system 300.

Processor 320 may include at least one conventional processor or microprocessor that interprets and executes instructions. Memory 330 may be a random access memory (RAM) or another type of dynamic storage device that stores information and instructions for execution by processor 320. Memory 330 may also store temporary variables or other intermediate information used during execution of instructions by processor 320. ROM 340 may include a conventional ROM device or another type of static storage device that stores static information and instructions for processor 320. Storage device 350 may include any type of media, such as, for example, magnetic or optical recording media and its corresponding drive.

Input device 360 may include one or more conventional mechanisms that permit a user to input information to system 300, such as a keyboard, a mouse, a pen, a voice recognition device, etc. Output device 370 may include one or more conventional mechanisms that output information to the user, including a display, a printer, one or more speakers, or a medium, such as a memory, or a magnetic or optical disk and a corresponding disk drive. Communication interface 380 may include any transceiver-like mechanism that enables system 300 to communicate via a network. For example, communication interface 380 may include a modem, or an Ethernet interface for communicating via a local area network (LAN). Alternatively, communication interface 380 may include other mechanisms for communicating with other devices and/or systems via wired, wireless or optical connections.

System 300 may perform such functions in response to processor 320 executing sequences of instructions contained in a computer-readable medium, such as, for example, memory 330, a magnetic disk, or an optical disk. Such instructions may be read into memory 330 from another computer-readable medium, such as storage device 350, or from a separate device via communication interface 380.

Unsupervised and Active Learning

The problem of identifying a caller's request is considered as a multi-class multi-label problem. Given a set of semantic call types (or semantic classes) $C=\{C_1, \ldots, C_n\}$ and a sequence of input words $W=\{W_1, \ldots W_m\}$, the objective is to compute the posterior probability of each class, $P(C_i|W)$ and retain those that are above a predetermined threshold.

First, an ASR process is examined. Given a set of observations X, a hypothesized sequence of words $\hat{W}$ may be obtained using a maximum a posteriori (MAP) decoder:

$$\hat{W} = \underset{W}{\operatorname{argmax}} P_\Theta(X \mid W) \cdot P_\Phi(W)^\eta \qquad (1)$$

where $P_\Theta(X|W)$ is the acoustic observation probability that is modeled by a hidden Markov model $\Theta$. $P_\Phi(W)$ is the n-gram language model probability with underlying set of parameters $\Phi$. The factor $\eta$ is the grammar scale.

Although $P_\Theta(X|W)$ can be used across different applications without a need for in-domain speech data, $P_\Phi(W)$ requires extensive in-domain conversational data to reliably compute the n-gram statistics. Even when speech data is available, transcribing it manually is an expensive process, full of errors and it generally delays the application creation cycle. If sufficient transcribed data is available, then the natural solution is to apply MAP adaptation so that a new model $\Phi$ is computed such that:

$$\Phi = \underset{\Phi}{\operatorname{argmax}} [f(W \mid \Phi) \cdot g(\Phi)], \qquad (2)$$

where $f(W|\Phi)$ is the discrete density function of W and $g(\Phi)$ is the prior distribution which is typically modeled using a Dirichlet density. With some simplification, the MAP estimate can be reduced to a weighted linear interpolation of the out-of-domain prior model and in-domain samples.

Another approach to language model adaptation is the mixture modeling. While MAP adaptation preserves the model structure of the background language models, mixture models incorporate the parameters from all sources:

$$P(w_i \mid w_{i-n+1} \ldots w_{i-1}) = \sum_j \gamma_j P_j(w_i \mid w_{i-n+1} \ldots w_{i-1}),$$

where $P_j(.)$ is the $j^{th}$ mixture probability estimate and $\gamma_j$ is the mixture weight, estimated through held out data, such that $\Sigma_j \gamma_j = 1$.

Three scenarios are considered while creating spoken language models for call classification. The first scenario assumes that no in-domain transcription or speech data is available, and thus relies solely on an out-of-domain prior model. In this scenario a bootstrapped language model $\Phi$ is formed based on mining relevant material from various data sources. The sources of data may include (a) human/human conversational data, for example, from the Switchboard corpus, (b) human/machine conversational data that was collected from various spoken dialog applications, and (c) text data that was mined from relevant websites of the World-Wide-Web. Including the Web data reduces the out-of-vocabulary rate and provides a sizable improvement in accuracy.

The second scenario assumes that speech data is available but is untranscribed. In this scenario, an iterative two-step method was adopted. In the first step, the bootstrapped model, $\Phi$, may be used to generate word sequences $\hat{W}$. Given that $\Phi$ is universal, a lower grammar scale was used to strengthen the effect of $P_\Theta(X|W)$, where $P_\Theta(X|W)$ is the acoustic observation probability that is modeled by a hidden Markov model $\Theta$. In the second step, a new language model $\Phi$ may be computed using the ASR output of the in-domain speech data and other available transcribed data.

The third scenario assumes that limited data can be manually transcribed. In this scenario, active learning may be applied to intelligently select and then transcribe a small fraction of the data that is most informative. Word and utterance confidence scores computed from ASR output word lattices during the selection may be used. The rest of the data that is not yet transcribed may be used in unsupervised learning. The transcribed data may be used in conjunction with $\hat{W}$ for building $\Phi$. Having high-quality ASR output may be essential for labelers to generate high-quality labels. Active learning reduces the labeling effort as well as improves the labeling accuracy because it identifies utterances with low confidence scores for manual transcription. The rest of the data with high confidence scores can be manually labeled directly using recognized speech.

Figure 4:
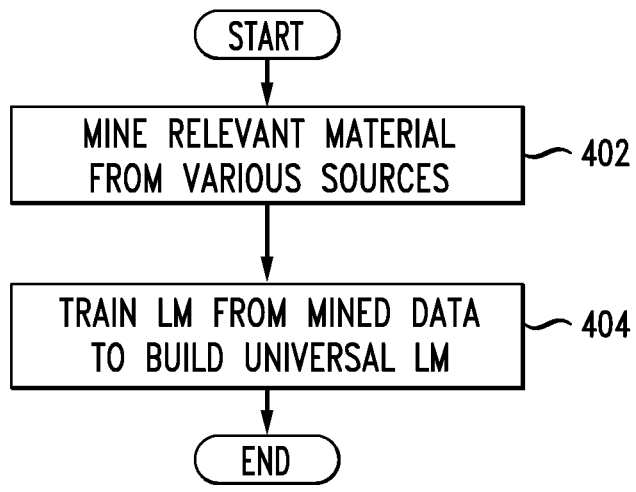
FIG. 4 is a flowchart that illustrates exemplary processing, for a first scenario, in an implementation consistent with the principles of the invention.

FIG. 4 is a flowchart that illustrates exemplary processing that may be performed in implementations consistent with the principles of the invention. The flowchart of FIG. 4 illustrates exemplary processing associated with the first scenario, described above. This scenario assumes that there are no in-domain transcription or speech data available. First, a bootstrapped language model $\Phi$ may be formed by mining data from various sources such as, for example, human/human conversational data from a Switchboard corpus, human/machine conversational data collected from spoken dialog applications, and text data mined from relevant web sites on the World Wide Web (act 402). Next, a language model may be trained from the mined data to build a universal language model (act 404).

Figure 5A:
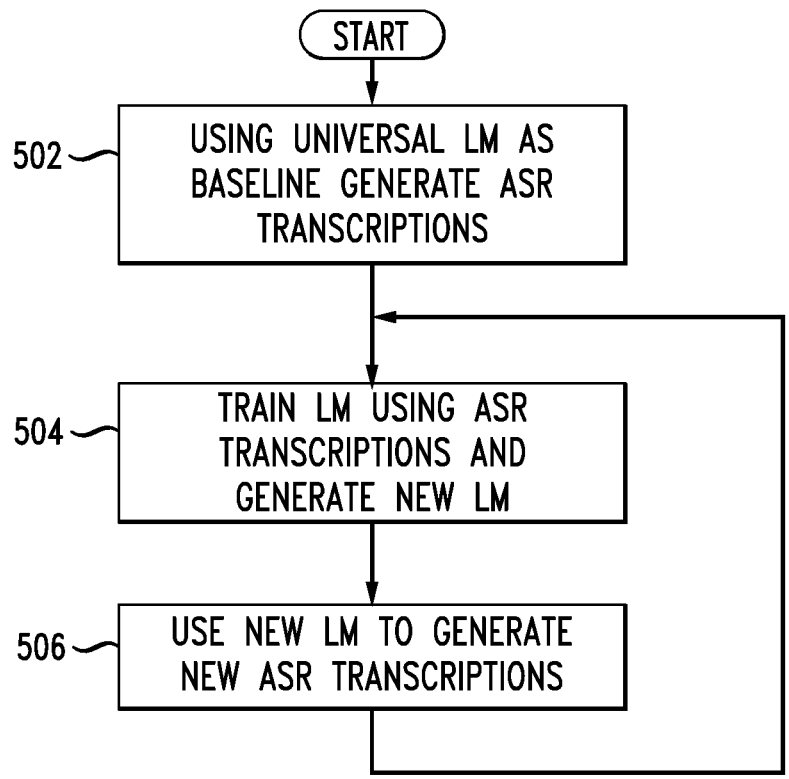
FIG. 5A is a flowchart that illustrates exemplary processing, for a second scenario, in an implementation consistent with the principles of the invention.

FIG. 5A is a flowchart that illustrates exemplary processing that may be performed in implementations consistent with the principles of the invention. The flowchart of FIG. 5A illustrates exemplary processing associated with the second scenario, described above. This scenario assumes that data is available, but is untranscribed. The exemplary processing illustrated by the flowchart of FIG. 5A may be performed after building the bootstrapped model $\Phi$ in the first scenario. First, using the bootstrapped model $\Phi$ as a baseline, ASR transcriptions may be generated from audio files (act 502). A new language model may be trained using the ASR transcriptions and any available transcribed data (act 504). The new language model may then be used to generate new ASR transcriptions (act 406). This process may be performed iteratively. That is, acts 504-506 may be repeatedly performed.

Figure 5B:
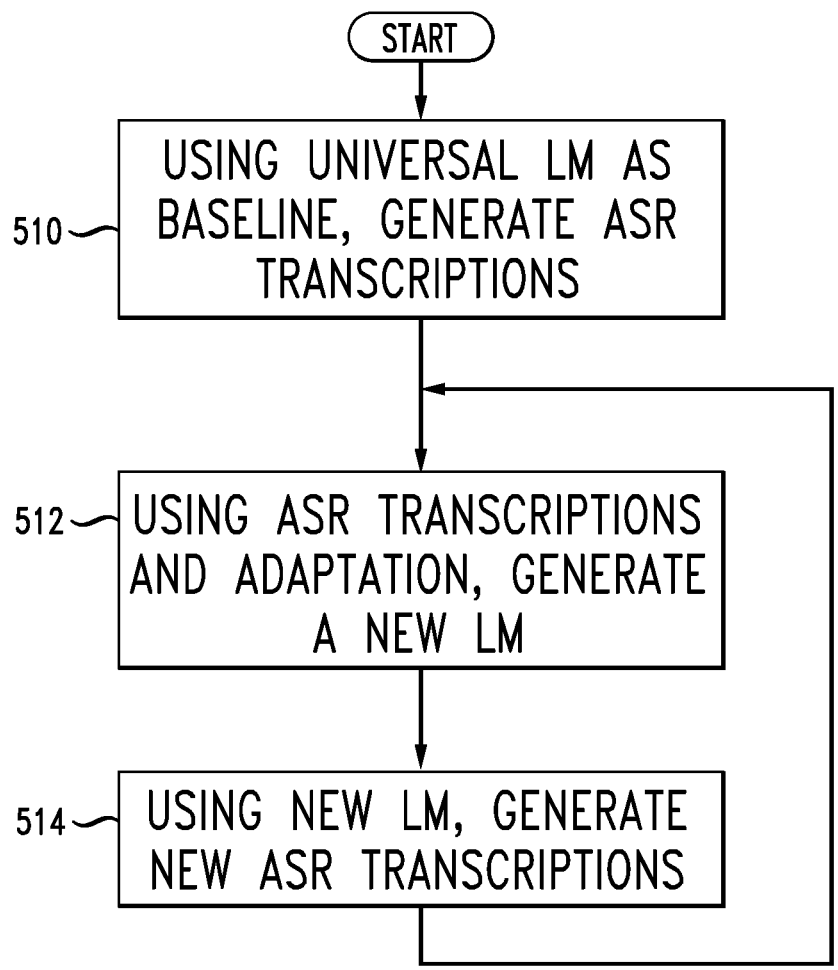
FIG. 5B is a flowchart that illustrates exemplary processing, for the second scenario, in an alternate implementation consistent with the principles of the invention.

FIG. 5B is a flowchart that illustrates an exemplary alternative process to the process of FIG. 5A. First, using the bootstrapped model Φ as a baseline model, ASR transcriptions may be generated from audio files (act 510). The ASR transcribed data and adaptation may be applied to generate a new language model. The adaptation may be a MAP adaptation, such that a new model Φ may be computer according to Equation 2, above. Other adaptation formulas may also be used instead of the MAP adaptation.

Figure 6:
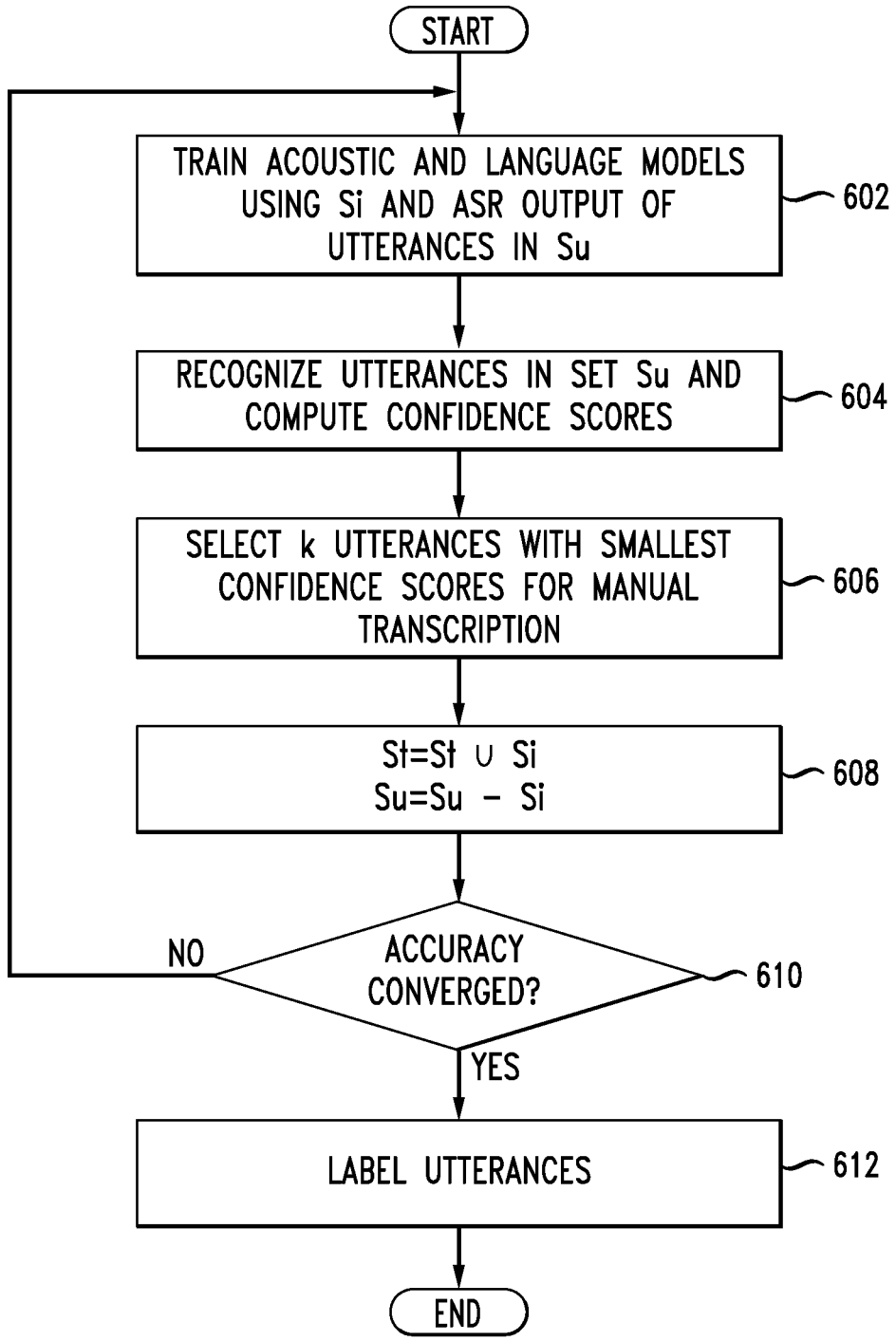
FIG. 6 is a flowchart that illustrates exemplary processing, for a third scenario, in an implementation consistent with the principles of the invention.

FIG. 6 is a flowchart that illustrates exemplary processing in an implementation consistent with the principles of the invention. The flowchart of FIG. 6 illustrates exemplary processing associated with the third scenario, described above. This scenario assumes that limited data can be manually transcribed. The process may begin with training module 110 training an initial language, $LM_i$ using a small set of manually transcribed data, $S_t$, from utterance data 102, where i is an iteration number, and using automatic speech recognition module 104 output from utterances that have not been manually transcribed, $S_u$ (act 602). Next, the utterances of set $S_u$ may be recognized by automatic speech recognition module 104 and confidence scores may be calculated (act 604).

Unsupervised learning aims to exploit non-manually transcribed data to either bootstrap a language model or in general improve upon the model trained from the transcribed set of training examples. The core problem of unsupervised learning is the estimation of an error signal. In language modeling, the error signal is the noise on event counts. Even in the simple case of n-gram language modeling, the n-grain counts in the presence of noise are very unstable.

In standard n-gram estimation, the occurrences of n-tuples may be counted to produce $C(w_1^n)$, where $w_1^n$ is the word n-tuple $w_1, w_2, \ldots, w_n$. In unsupervised learning, the nature of the information is noisy and the n-gram counts are estimated from two synchronized information channels, the speech utterance hypothesis and the error signal. For each word $w_i$ we estimate the probability of being correctly decoded as $c_i=1-e_i$, where $e_i$ is an error probability. That is, $c_i$ is its confidence score. The bidimensional channel may then be represented as a sequence of n-tuples of symbol pairs $(w_1^n, c_1^n)=(w_1, c_1)(w_2, c_2), \ldots, (w_n, c_n)$. The n-gram counts in the presence of noise may be computed by marginalizing the joint channel counts:

$$C_{UL}(w_1^n) = \sum_{x \in \tau} c_x \delta_{w_1^n}(x) \quad (3)$$

where $c_x$ is the confidence score for the n-tuple x in the noisy spoken utterance transcriptions τ and $\delta_{w_1^n}(x)$ is the indicator function for the n-tuple $w_1^n$. The confidence score of the n-tuple $w_1^n$ may be computed by geometric or arithmetic means or max and min over the n-tuple of word confidence scores $c_1^n$. Equation 3 may be rewritten as a function of the error probability $e_n$:

$$C_{UL}(w_1^n) = C(w_1^n) - \sum_{x \in \tau} e_x \delta_{w_1^n}(x) \quad (4)$$

This equation shows the relation between the count estimates with and without error signal, $C_{UL}(w_1^n)$ and $C(w_1^n)$, respectively.

The n-gram counts $C_{AL-UL}(w_1^n)$ from human transcribed (via Active Learning) and automatic speech recognition transcribed speech utterances may be computed in the following way:

$$C_{AL-UL}(w_1^n)=C_{AL}(w_1^n)+C_{UL}(w_1^n) \quad (5)$$

Referring back to FIG. 6, active and unsupervised learning module 106 may select k utterances from set $S_u$ with the smallest confidence scores for manual transcription (act 606). In one implementation consistent with the principles of the invention, confidence scores may be determined from lattices output from automatic speech recognition module 104. Other methods of determining confidence scores may be used in other implementations. In some implementations consistent with the principles of the invention, k may be set to 1. In other implementations consistent with the principles of the invention, k may be set to a higher value. The set of manually transcribed data, $S_t$, may then have the most recent k manually transcribed items, $S_i$, included into set $S_t$. The set of automatically transcribed data, $S_u$, may have the most recently transcribed k items of data, $S_i$, removed (act 608). A check may then be performed to determine whether word accuracy has converged (act 610). That is, word accuracy is checked to determine whether there is an increase in word accuracy over the previous set of automatically transcribed data, $S_u$. If word accuracy has not converged (word accuracy has increased), then acts 602 through 610 may be repeated. Otherwise, labeler 114 may label the automatically transcribed items having high confidence scores (i.e., confidence scores greater than a threshold) as well as the manually transcribed data (act 612) and the process is completed.

Testing Results

Table 1 summarizes the characteristics of our test application including amount of training and test data, total number of call-types, average utterance length, and call-type perplexity. Perplexity was computed using the prior distribution over all the call-types in the training data.

TABLE 1

Data characteristics used in the experiments.

| | |
|---|---|
| Training Data Size | 29,561 utterances |
| Test Data Size | 5,537 utterances |
| Number of Call-Types | 97 |
| Call-Type Perplexity | 32.81 |
| Average Length | 10.13 words |

Automatic speech recognition module 104 performance was measured in terms of word accuracy on the test set. Inspired by the information retrieval community, the classification performance was measured in terms of an F-Measure metric. F-Measure is a combination of recall and precision:

$$F\text{-Measure} = \frac{2 \times \text{recall} \times \text{precision}}{\text{recall} + \text{precision}}$$

where recall is defined as the proportion of all the true call-types that are correctly deduced by a call classifier. F-Measure may be obtained by dividing the number of true positives by the sum of true positives and false negatives. Precision is defined as the proportion of all the accepted call-types that are also true. It is obtained by dividing true positives by the sum of true positives and false positives. True positives are the number of call-types for an utterance for which the deduced call-type has a confidence above a given threshold, hence accepted, and is among the correct call-types. False positives are the number of call-types for an utterance for which the deduced call-type has a confidence above a given threshold, hence accepted, and is not among the correct call-types. False negatives are the number of call-types for an utterance for which the deduced call-type has a confidence less than a threshold, hence rejected, and is among the true call-types. True negatives are the number of call-types for an utterance for which the deduced call-type has a confidence less than a threshold, hence rejected, and is not among the true call-types. The best F-Measure value is selected by scanning over all thresholds between 0 and 1.

Figure 7:
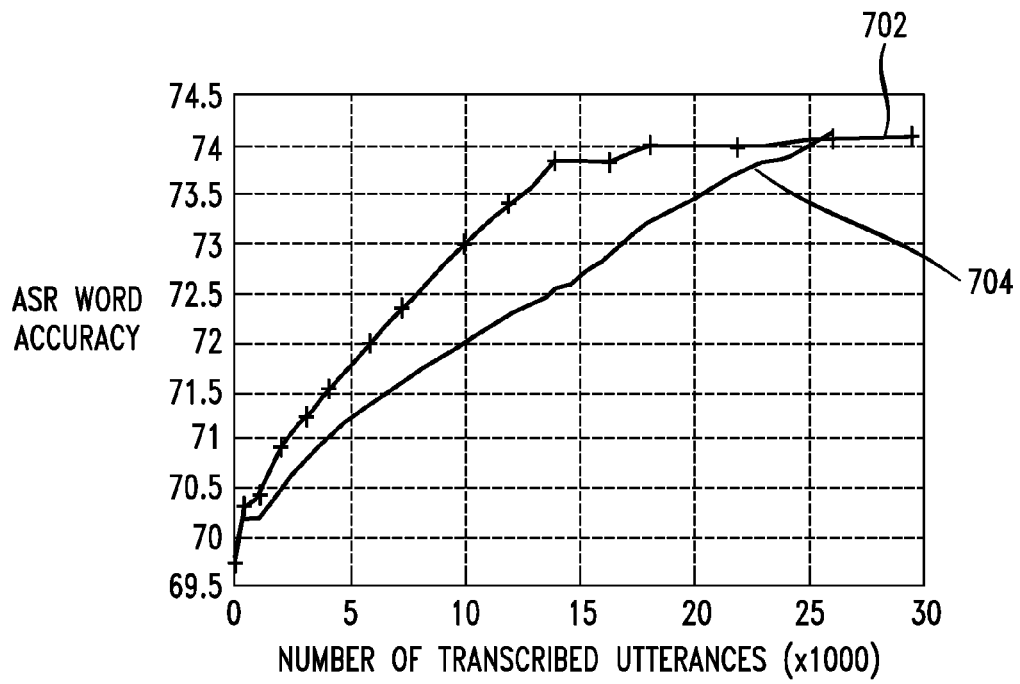
FIGS. 7 and 8 are graphs that illustrate performance of implementations consistent with the principles of the invention.

FIG. 7 shows how the word accuracy changes when utterances are selected either randomly or through active learning. Plot 702 represents active and unsupervised learning and plot 704 represents random and unsupervised learning. These plots were generated at a run-time of 0.11 times real time. At an equal number of manually transcribed utterances, the automatic speech recognition accuracy clearly rises faster with active learning than with random selection.

Figure 8:
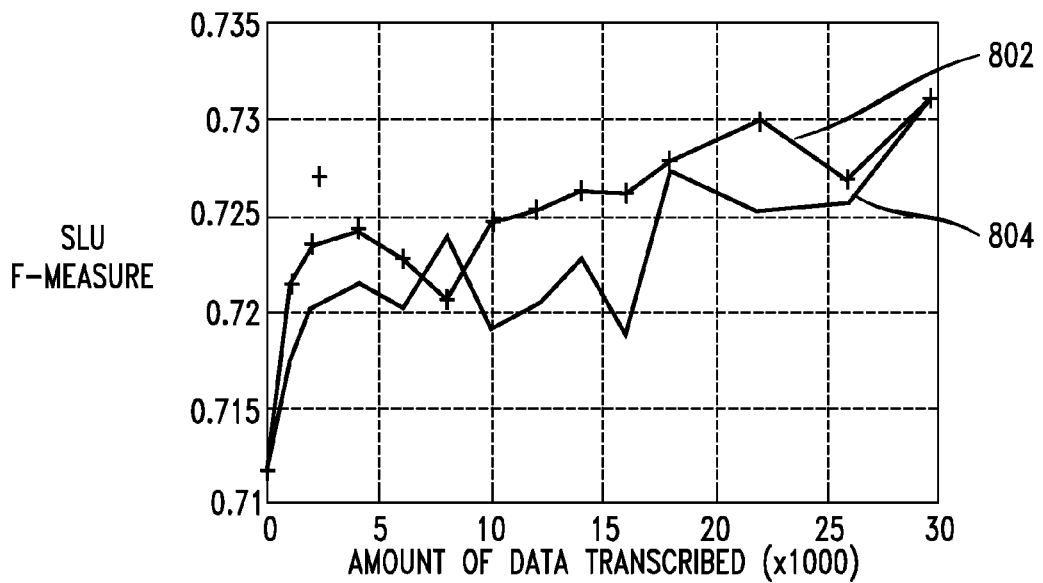

FIG. 8 shows the corresponding call classification performances. Plot 802 represents active and unsupervised learning and plot 804 represents random and unsupervised learning. As FIG. 8 shows, the combination of active and unsupervised learning is superior to combining random sampling of the data with unsupervised learning.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, implementations consistent with the principles of the invention may be implemented in software, hardware, or a combination of software or hardware. Similarly, instead of using a conventional processor, in some implementations consistent with the principles of the invention, an application specific integrated circuit (ASIC) may be used. Accordingly, the appended claims and their legal equivalents should only define the invention, rather than any specific examples given.

We claim as our invention:

1. A method comprising:
    performing, via a processor, automatic speech recognition using a bootstrap model on utterance data not having a corresponding manual transcription, to produce automatically transcribed utterances, wherein the bootstrap model is based on text data mined from a website relevant to a specific domain;
    selecting, via the processor, a predetermined number of utterances not having a corresponding manual transcription based on a geometrically computed n-tuple confidence score;
    receiving transcriptions of the predetermined number of utterances, wherein the transcriptions are made by a human being; and
    generating a language model based on the automatically transcribed utterances, the predetermined number of utterances, and the transcriptions.

2. The method of claim 1, further comprising:
    performing automatic speech recognition using the language model.

3. The method of claim 2, further comprising:
    iteratively repeating the performing of automatic speech recognition using the bootstrap model, the selecting, the receiving, the generating, and the performing of speech recognition using the language model until a word accuracy converges.

4. The method of claim 1, wherein the predetermined number of utterances correspond to a specific number of utterances having lowest confidence scores.

5. The method of claim 1, wherein the predetermined number of utterances used in generating the language model are equal in number to the automatically transcribed utterances.

6. The method of claim 1, wherein the predetermined number of utterances are randomly selected.

7. The method of claim 1, wherein the language model is further based on the bootstrap model.

8. A system comprising:
    a processor; and
    a computer-readable storage medium having instructions stored which, when executed by the processor, cause the processor to perform operations comprising:
        performing automatic speech recognition using a bootstrap model on utterance data not having a corresponding manual transcription, to produce automatically transcribed utterances, wherein the bootstrap model is based on text data mined from a website relevant to a specific domain;

selecting a predetermined number of utterances not having a corresponding manual transcription based on a geometrically computed n-tuple confidence score;

receiving transcriptions of the predetermined number of utterances, wherein the transcriptions are made by a human being; and generating a language model based on the automatically transcribed utterances, the predetermined number of utterances, and the transcriptions.

9. The system of claim 8, the computer-readable storage medium having additional instructions stored which, when executed by the processor, result in operations comprising:

performing automatic speech recognition using the language model.

10. The system of claim 9, the computer-readable storage medium having additional instructions stored which, when executed by the processor, result in operations comprising:

iteratively repeating the performing of automatic speech recognition using the bootstrap model, the selecting, the receiving, the generating, and the performing of speech recognition using the language model until a word accuracy converges.

11. The system of claim 8, wherein the predetermined number of utterances correspond to a specific number of utterances having lowest confidence scores.

12. The system of claim 8, wherein the predetermined number of utterances used in generating the language model are equal in number to the automatically transcribed utterances.

13. The system of claim 8, wherein the predetermined number of utterances are randomly selected.

14. The system of claim 8, wherein the language model is further based on the bootstrap model.

15. A computer-readable storage device having instructions stored which, when executed by a computing device, cause the computing device to perform operations comprising:

performing automatic speech recognition using a bootstrap model on utterance data not having a corresponding manual transcription, to produce automatically transcribed utterances, wherein the bootstrap model is based on text data mined from a website relevant to a specific domain;

selecting a predetermined number of utterances not having a corresponding manual transcription based on a geometrically computed n-tuple confidence score;

receiving transcriptions of the predetermined number of utterances, wherein the transcriptions are made by a human being; and generating a language model based on the automatically transcribed utterances, the predetermined number of utterances, and the transcriptions.

16. The computer-readable storage device of claim 15, having additional instructions stored which, when executed by the processor, result in operations comprising:

performing automatic speech recognition using the language model.

17. The computer-readable storage device of claim 16, having additional instructions stored which, when executed by the processor, result in operations comprising:

iteratively repeating the performing of automatic speech recognition using the bootstrap model, the selecting, the receiving, the generating, and the performing of speech recognition using the language model until a word accuracy converges.

18. The computer-readable storage device of claim 15, wherein the predetermined number of utterances correspond to a specific number of utterances having lowest confidence scores.

19. The computer-readable storage device of claim 15, wherein the predetermined number of utterances used in generating the language model are equal in number to the automatically transcribed utterances.

20. The computer-readable storage device of claim 15, wherein the predetermined number of utterances are randomly selected.

* * * * *